| United States Patent [19] | [11] 4,307,003 |
| --- | --- |
| Niswonger | [45] Dec. 22, 1981 |

[54] CURABLE RESIN COMPOSITIONS

[76] Inventor: Dewey F. Niswonger, P.O. Box 4105, Redding, Calif. 96001

[21] Appl. No.: 77,700

[22] Filed: Sep. 28, 1979

[51] Int. Cl.³ .............................................. C08L 91/00
[52] U.S. Cl. ............................ 260/28.5 D; 260/28 R; 260/28 P; 260/28.5 R; 260/37 R; 260/37 SB; 260/40 R; 260/42.41
[58] Field of Search .............. 260/28 R, 28 P, 28.5 R, 260/28.5 D, 37 R, 37 SB, 40 R, 42.41

[56] References Cited

U.S. PATENT DOCUMENTS 3,508,945  4/1970  Haemer et al. ........................ 264/49
3,726,817  4/1973  Niswonger ..................... 260/28.5 R Primary Examiner—Melvyn I. Marquis
Attorney, Agent, or Firm—Townsend and Townsend

[57] ABSTRACT

Improved, curable resin compositions are provided for use as and for surface coatings, flooring, structural fabricated parts, cast parts, dry lubricants and as dry filler for other resin systems, to reduce surface friction. The resin compositions comprise an unsaturated polyester type resin or an epoxy type resin, a filler paste consisting of dimethyl silicone, polytetrafluoroethylene, polyethylene and ouricury wax and a color pigment. For use outdoors, the compositions contain, additionally, an ultraviolet light stabilizer. Compositions for use as conditioners and cleansers for the surfaces are also provided.

11 Claims, No Drawings

CURABLE RESIN COMPOSITIONS

BACKGROUND OF THE INVENTION

1. Field of the Invention

The subject invention relates to improved curable resin compositions, as also surface coatings and dry lubricants formulated therefrom. More specifically, it deals with improved polyester type or epoxy type resin compositions comprising the resin, dimethylsilicone, polytratrafluoroethylene, a filler powder (which consists of ultra high molecular weight polyethylene and optionally, ouricury wax) and a pigment, which compositions cure to a hard, smooth surface with a low coefficient of friction. For use outdoors, stabilizers against ultraviolet light (UV) degradation are added to the subject compositions.

A great deal of research effort has been directed in recent times toward the development of hard smooth surfaces for use as ice skating surfaces and for other similar recreational uses. Most of the reported compositions and surface coatings suffer from serious limitations and drawbacks in terms of durability, high cost of installation and maintenance, shrinkage, degradation of the chemicals used, and manufacturing problems.

The subject invention utilizes a new "filler" material, which is a mixture of dimethyl silicone, polytratrafluoroethylene, polyethylene and ouricury wax, which mixture is commercially available under the trademark "Polyuracarbosil" (manufactured by Cetnus Chemical Company) which enhances and vastly improves the overall durability, skatability, and water resistance. The shrinkage factor of the surface coated with the subject composition is minimized and the surface friction is considerably lowered thereby improving the bonding strength. The compositions of the subject invention may be bonded to any suitably prepared substrate such as concrete, wood, plastic or metal surface by trowelling, painting or coating to a desired thickness or sprayed on when a thin-set flooring is desired. The surface may be further improved for skatability by the application of a thin layer of the conditioner composition provided herein. This conditioner composition may be removed by the cleanser composition provided and reapplied later to regenerate the skating surface. This process of application and removal of the conditioner composition may be repeated several times over a long period of time without affecting the desirable characteristics of the coated surface.

Thus, the surfaces treated with the subject resin composition may be converted and used alternately as ice skating or roller skating surfaces, decks, flooring, dance floors, or shuffle boards. The resin composition may also be used for coating wood paneling, for waterproof lumber, concrete block coating and swimming pool coatings. When epoxy type resin is used, the composition is eminently suited for outdoor use. The compositions may also be cured in block form, pulverized and dispersed over a substrate thus instantly transforming it to a dance floor, shuffle board or the like, or used as a dry filler with other resin systems or as a dry lubricant in door glides or for similar purposes. As an ice skating surface, the subject resin composition offers an excellent, viable replacement for the existing expensive, energy-consuming refrigeration systems.

2. Description of the Prior Art

A large number of surface coating materials for various purposes have been formulated and reported. For purposes of this subject invention, the most relevant are discussed. U.S. Pat. No. 3,508,945 teaches the use of a porous polymer sheet with the pores therein filled with a silicone lubricant, for use as an ice skating surface. However, with said surface, the surface lubricant must be carefully monitored and its optimum level maintained as otherwise, the skatability and smoothness of the surface will be lost.

U.S. Pat. No. 3,726,817 deals with surface coating compositions comprising polyester resin, wax and flock, for use as synthetic ice skating surfaces and for other similar smooth surfaces. These formulations are extremely difficult to mix and do not yield a smooth uniform, homogeneous product for application or spraying. Thus, the surfaces obtained from these compositions do not yield the highly smooth and skatable surfaces desirable for ice skating purposes. These compositions lack the desirable characteristics such as ease of blending and application, stripping, preparation and durability.

SUMMARY OF THE INVENTION

Improved, curable resin compositions are provided which comprise about 50 to 90% by weight of a curable, styrene solution of an unsaturated polyester type resin or an epoxy type resin, a filler consisting of about 10 to 60% by weight of a mixture of dimethyl silicone, polytratrafluoroethylene, polyethylene and ouricury wax (Polyuracarbosil) and about 2 to 6% by weight of a color pigment. When used as coatings which are likely to be exposed to substantial sunlight, the composition includes additionally a sufficient amount of an ultraviolet light stabilizer to prevent UV light degradation of the compositions. When used for an ice skating surface, it is desirable to apply on top of the cured resin composition coating, a thin coating of the specially developed surface conditioner composition, which may be removed or stripped at will by means of a specially developed cleanser composition. The conditioner composition may be reapplied when required. This process of stripping and reapplication may be repeated several times without any deleterious effects.

DESCRIPTION OF THE PREFERRED EMBODIMENTS

The unsaturated polyester resins of the composition of the subject invention are condensation products of alkylene glycols and organic acids or acid anhydrides. Typical acids or the corresponding anhydrides are maleic acid, fumaric acid, pthalic acid, isopthalic acid, adipic acid, succinic acid and the like. Typical glycols are ethylene glycol, propylene glycol, diethylene glycol or the like. The materials and method for the preparation of the unsaturated polyester resin are the same as those disclosed in U.S. Pat. No. 3,726,817, Col. 2, lines 2-37, which disclosure is incorporated herein by reference and made a part hereof. Presence of metal catalysts, such as cobalt naphthenate may be employed to accelerate the reaction.

The epoxy resin of the compositions of the subject invention are diglycidyl ethers of bisphenol A which are prepared by the reaction of epichlorohydrin with bisphenol A in the presence of an alkylene catalyst. By controlling the experimental conditions and varying the ratios of epichlorohydrin to bisphenol A, resins of varying molecular weight ranges may be obtained. Alkylene catalysts used in the process are well known in the art.

The filler used in the instant composition is a mixture of dimethyl silicone, polytratrafluoroethylene, ultra-high molecular weight polyethylene and optionally, ouricury wax in undisclosed ratios. The mixture is a proprietary product of Cetnus Chemical Company and is commerically available under the trademark of "Polyuracarbosil." The components are chemically inert and do not reach or interact with the other components of the resin compositions. The filler mixture described above is marketed by Cetnus Chemical Company and will be hereinafter referred to as "Polyuracarbosil." With the use of Polyuracarbosil added to the resin compositions, the final cured coating becomes waterproof and exhibits a low coefficient of surface friction, making such a coated surface ideally suited for use as a synthetic ice skating surface and for such other uses and purposes where low friction surfaces or materials are required or needed. The composition may also be cured in block form, pulverized and used as dry powder lubricants. For most purposes, Polyuracarbosil, about 10 to 60% by weight, is adequate. For a smooth ice skating surface, a preferred surface coating composition will contain about 30 to 40% by weight of Polyuracarbosil. Polyuracarbosil also acts as a plasticizer, imparting to the surface, higher and better lubricating characteristics. In formulating the subject compositions, the Polyuracarbosil is used in the form of a paste to facilitate thorough mixing and blending uniformly into the resin components.

The color pigments used are standard inorganic pigments such as titanium dioxide or other liquid colorants, which are chemically inert and do not affect or alter the properties of the other ingredients.

Ultraviolet stabilizers which may be added to the subject compositions are those listed in U.S. Pat. No. 3,726,817 which are hereby incorporated by reference. These include but are not limited to various hydroxylated benzophenones such as 2,4-dihydroxy-benzophenone, 2-hydroxy-4-methoxy-benzophenone, 4-dodecyloxy-2-hydroxy-benzophenone, hydroxylated benzotriazole such as 2-(2'-hydroxy-5'-methyl phenyl)-benzotriazole, 2-(3',5'-di-tert-butyl-2'-hydroxy phenyl)-5-chloro benzotriazole, 2-(3'-tert-butyl-2'-hydroxy-5'-methyl phenyl)-5-chloro benzotriazole, salicylates such as phenyl salicylate, and acrylonitriles such as 2-octyl-2-cyano-3,3-diphenyl acrylate, and ethyl-2-cyano-3,3-diphenyl acrylate. About 1 to 5% by weight of the stabilizer will usually be sufficient to significantly reduce UV degradation of the coatings.

The resin solution, Polyuracarbosil filler, color pigment and UV stabilizer may be blended into a fluid mixture as follows. The polyester or epoxy resin solution is first placed in a mixing vat and the color pigment and UV stabilizers are then added and mixed with the other ingredients. When these ingredients are well blended, the Polyuracarbosil paste is then added and mixed in with the remaining ingredients till a smooth uniformly homogeneous liquid composition is obtained. The Polyuracarbosil may be premixed with the other ingredients prior to actual use or may be incorporated into the resin composition at the time of applying the composition to the substrate. It is important that the mixing process be slow so as to prevent air being entrapped into the mixture as otherwise bubbles and air holes will appear in the cured surface, thus rendering it unfit for use as a skating surface.

Prior to application of the composition to the desired substrate, a curing catalyst must be added to the formulation of polyester or epoxy resin, whichever type of resin system is being used. The desired or preferred catalyst for use with the polyester system would be a methyl ethyl ketone peroxide which promotes an exothermic crosslinking reaction between the linear polyester and the reactive monomer solvent. The amount of catalyst added will depend upon the application temperature which is usually ambient temperature and the desired resin gelling and curing time. More than 2% or less than 0.25% based on the weight of the resin solution will rarely, if ever, be required. Typically about 0.5 to 1.5% will be used for curing at ambient temperature. More preferably, about 1% will be used. Higher catalyst concentration but within the above specified range may be used for applying thin coatings which permit rapid heat dissipation, whereas lower concentrations of catalyst in the above range should be employed for thicker coating from which heat transfer will be slow. By controlling the concentration of the catalyst used, minimum shrinkage of the surface while curing can be achieved, thus insuring a good bond to the substrate. The epoxy resin must also be cured with crosslinking agents, hardeners or catalysts to develop the desirable properties. The epoxy and hydroxyl groups are the reactive sites through which crosslinking occurs. Useful crosslinking agents include amines, anhydrides, aldehyde condensation products and Lewis acids. Careful selection of the curing agent is required to achieve a balance of properties desirable for application and initial handling characteristics. Typically, aliphatic amines such as diethylene triamine and triethylene tetraamine are often used where curing is done at ambient temperature and where thermal requirements are generally low, i.e. heat deflection temperatures are under 100° C. Where elevated curing temperatures are acceptable and employed, aromatic amines such as methylene dianiline are used. Anhydride systems such as hexahydrophthalic anhydride are used when good adhesion, acceptable thermal properties and long shelf life are desired or required for the compositions.

Prior to application to the desired substrate, the curing catalyst, usually a free radical initiator, and a small amount of a metal catalyst such as cobalt naphthenate which reacts with the curing catalyst to initiate the free radical reaction is blended into the composition. The metal catalyst is usualy blended into the composition before the curing catalyst. Concentrated mixtures of the curing catalyst and metal catalyst may be explosive and should be avoided.

The catalyst containing composition may be applied to the desired substrate by pouring, trowelling or spraying. In all types of application, it is essential that the substrate be properly prepared to ensure a strong bond between the substrate and the coating composition. There are three main types of substrates to which the compositions may be applied, viz., concrete, wood, and metal. Each requires a different type of preparation. However, in general, they must all be clean, dry and must have a suitable texture and not be subject to hydrostatic pressure from ground water. New concrete should have a smooth trowel finish, a broom finish or a rock salt finish and must be cured for a minimum of 30 days in the absence of any quick curing additives blended into or sprayed onto the green concrete. Preparation procedures for the various substrates are disclosed in U.S. Pat. No. 3,726,817, Col. 3, line 55 to Col. 4, line 47, which disclosure is hereby incorporated by reference.

Laitence (the thin skin on cured cement that lies on the concrete surface) must be removed by mechanical means such as grinding, sandblasting or acid etching with a dilute aqueous solution of hydrochloric acid. All concrete floors must be thoroughly cleaned to remove contaminants such as oil, grease, wax, soap and the like. A solvent wash followed by a strong detergent wash will usually remove such contaminants. If the concrete surface has been penetrated by these contaminants, the entire contaminated layer must be removed. If the concrete is weak due to acid etching or mechanical damage, the entire weak area must be removed. Slick, smooth troweled areas must be roughened to provide proper bonding for the composition. The entire surface of the old concrete should be mechanically cleaned or acid etched after the contaminants are removed. Structural cracks in either old or new concrete must be cleaned and filled with grouting.

Wood surfaces must also meet the general requirements set forth above. In general, it is best to avoid coating wood surfaces that are composed of metal strips or plank flooring. It is desirable to cover such surfaces with one quarter inch thick exterior plywood, before applying a coating of the composition of the subject invention. The plywood should be sanded to roughen its outer surface. Any joints between the plywood sheeting should be covered with fiberglass tape.

Metal surfaces must be cleaned of rust, oil, paint and other contaminants by sandblasting or wire brushing. It is recommended that the metal be primed with an epoxy primer containing a corrosion-resistant pigment such as zinc chromate or red lead prior to the application of the composition.

The compositions of the subject invention are not usually recommended for coating vinyl tile, linoleum, ceramic or quarry tile, asphalt surfaces, glass, painted or varnished surfaces or mastic flooring, as the bonding between such substrates and the subject composition is poor.

All substrates must have a primer coating after they have been properly prepared according to the procedures recited above. The primer coat can be zinc chromate, containing a polyamide epoxy primer. The epoxy primer should contain photochemically non-reactive solvents and must meet existing air pollution regulations wherever applicable.

The catalyst containing composition may be poured or trowelled or sprayed directly onto a prepared substrate and spread thereover with a straight edged tool. The composition should be rolled with a resin roller to ensure uniform thickness. Generally it will flow into the desired form and seek its own level, providing the substrate to which it is applied is level. Such rolling must be completed before the composition begins to gel. Under normal conditions, the composition will cure in about 2 to 4 hours. Curing may be speeded up or slowed down by adjusting the amount of catalyst. The temperature of the substrate will influence both the gelling and curing times, with low temperatures lengthening these processes and higher temperatures shortening the gelling and curing times. Preferably, the composition will be applied at temperatures in the range of about 50° to 100° F. Spraying the composition onto a prepared substrate speeds up the gelling and curing times considerably and eliminates rolling and handling of the catalyzed composition. The composition will normally be applied to a uniform thickness of about 1/32 to ¼ inch thick. For synthetic ice skating surfaces, a thickness of about 3/16 to ¼ inch is preferred.

A specially formulated conditioner is developed for use with the finished coated surfaces, to improve their skatability and durability characteristics, as well as to decrease the frictional coefficient. Frictional coefficient is determined by attaching a 100 pound weight to a pair of skates and measuring the lateral force required to initiate movement of the skates along the surface. The coefficient is the ratio of the required lateral force to the weight moved.

The conditioner composition comprises about 30 to 70% by volume of distilled water, about 20 to 40% by volume of a solution of a mixture of polyethylene and methoxy polyethylene glycols in a 6,000 molecular weight range (available under the trademark of Carbowax 6000), about 10 to 20% by volume of liquid silicone, about 1 to 10% by volume of a solution of polyalkylene glycols and diesters (available under the trade name of U.C.O.N.) and about 1 to 5% by volume of a wetting agent (Aerosol O.T.) blended together. This conditioner composition after a 1:4 dilution with water, may be applied to the cured surface by spraying or painting thereon, at the rate of about 1 gallon per 1,000 square feet. Application of the subject conditioner composition reduces the coefficient of friction of the surface by about 40 to 50%.

The conditioner composition described above may be removed or stripped at will, without adversely affecting the characteristics of the cured surface, by means of a specially formulated cleanser composition. The cleanser composition comprises about 30 to 60% by volume of distilled water, about 5 to 20% by volume xylene sulfonate, about 1 to 5% mono ethanolamine, about 1 to 5% a free acid of complex organic phosphate ester, about 1 to 5% of a solution of ethylene diamine tetra acidic acid tetra sodium salt, about 1 to 10% tetra potassium pyro phosphate, about 1 to 5% of a mono ionic surfactant, and about 0 to 1% of a pigment such as Acid Blue, all blended together to a uniformly homogeneous consistency. Monoionic detergents which may be used are organic sulfonates, sulfates and the like. The subject cleanser composition, after a 1:20 dilution with water, may be used to strip or remove the conditioner composition of the subject invention. Removal of the conditioner composition by the cleanser composition and reapplication of the conditioner composition may be repeated several times over a long period of time without adversely affecting the coated surfaces.

The following examples of the subject formulations are provided by way of illustration and not by way of limitation.

EXAMPLE 1

310 pounds (140.6 kilograms) of polyester resin containing the UV stabilizer were placed in a mixing vat equipped with rotating mixtures turned to a slow speed. 21.5 pounds (9.75 kilograms) of the color pigment (titanium dioxide) were added to the vat and mixed for 10 minutes or until the color was totally blended with the polyester resin. 168.5 pounds (76.4 kilograms) of Polyuracarbosil paste filler were slowly added to the vat with the mixers operating at medium speed and the mixing continued for another 15 minutes to ensure that the contents were homogeneously blended into a smooth liquid consistency (Mixture A).

A 400 square foot (37 square meters) of a concrete surface was prepared as a substrate for application of the above described composition. An epoxy primer was rolled onto the concrete surface to a 4 mil thickness and allowed to cure for 24 hours. About 2 grams (1% by weight) of methyl ethyl ketone peroxide were added to 200 grams of Mixture A and mixed together for about 10 minutes and then poured onto the concrete substrate and spread evenly with a notched hand trowel (notches in the trowel were ¼ inch (6.35 mm) deep), leaving a rippled finish with high ridges and low valleys, thereby establishing the finish grade or thickness for the surface and the finish coat. This application was left to cure for a period of 24 hours. The balance of Mixture A was then combined with a 1% solution by weight of methyl ethyl ketone peroxide and mixed together for 10 minutes. This composition was then poured into an airless spray equipment tank and sprayed onto the rippled surface so that all of the low areas were filled and the finished coating applied to a thickness of 1/32 inches (0.794 mm) higher than the ridges which were used as a guide to obtain an overall uniform thickness across the entire finished surface.

The observed bonding between the concrete and primer, the primer and the first trowelled rippled subcoat and the final finish coat were excellent. The surface was allowed to cure for a period of two days before any cleaning of the finished surface was undertaken. The cured surface retained a Shore Hardness of 85 which is ideal when the surface is used for ice skating, although a hardness range of the surface can vary from Shore D 70 to Shore D 90. This range is realized depending upon the amount of styrene that is formulated into the originally selected resin compositions.

EXAMPLE 2

155 pounds (70.3 kilograms) of an epoxy type resin were placed in a mixing vat equipped with rotating mixers turned to slow speed. 21.5 pounds (9.75 kilograms) of a color pigment (titanium dioxide) were added to the vat and mixed for 10 minutes or until the color pigment was totally blended into the epoxy resin. 168.5 pounds (76.4 kilograms) of the Polyuracarbosil paste filler were slowly added to the vat with the mixers operating at a medium speed and the mixing continued for an additional 15 minutes to ensure thorough mixing of the contents to a smooth uniform liquid consistency (Mixture B).

A 400 square feet (37 square meters) of a concrete surface was prepared as a substrate for application of the above described composition. The prepared composition (Mixture B) was then catalyzed with 50 pounds (22.7 kilograms) of an amine hardening agent and the mixing process was continued for an additional 10 minutes to ensure proper blending. The installation of the above described composition was accomplished with hand troweling the composition onto the substrate to a thickness of ¼ of an inch (6.35 mm) in sections of 20 feet by 20 feet square at a time. The observed bonding of the primer to the substrate, the epoxy composition to the primer were excellent and provided a tough resilient surface for skating and for other general uses. The surface was totally cured in about 1 week (7 days).

EXAMPLE 3

100 pounds (45.35 kilograms) of the polyester resin were placed in a mixing vat equipped with rotating mixers turned to slow speed. 100 pounds (45.35 kilograms) of the Polyuracarbosil paste filler were slowly added to the vat and the mixing continued for another 15 minutes (Mixture C).

A flat fiberglass sheet mold ½ inch (12.7 mm) deep and 6 feet by 12 feet (1.83 meters × 3.6 meters) in size was properly cleaned and prepared with a mold release so as to receive the above described composition. The composition (Mixture C) was then catalyzed with a 1.5% by weight of methyl ethyl ketone peroxide and mixed in the vat for an additional 10 minutes. The catalyzed composition was then poured into the prepared mold and left to cure. Once the composition had fully cured, (approximately 4 hours) the precast slab of the composition was removed from the mold. The precast slab was then pulverized into a fine powder with particles ranging in size from 20 up to 100 mesh. It was found that 80 mesh and smaller sized particles made an excellent dry lubricant for any surface to surface contact where a slow to medium movement is desired, i.e. dance floors, shuffle boards, decks, drawer guides, etc. It was found that the larger sized particles 20 to 70 mesh were excellent as a filler material for other types of liquid plastics and for use as synthetic marble chips for terrazzo flooring.

EXAMPLE 4

A special aqueous solution used in conditioning the described cured composition surface for ice skating was formulated as follows:

The percentages given are by volume for this formulation. About 50% distilled water was placed into a mixing vat and the mixing speed of the mixer was set at a medium speed. A 30% solution of Carbowax 6000 in an organic solvent was blended into the distilled water, along with a 14.8% liquid silicone (LE-46), a 5% U.C.O.N. fluid 50-HB-260 and a 2% Aerosol O.T. (75%). The total formulation was blended together in the vat for a period of 30 minutes. The formulation was then packaged into clean metal or plastic containers for use or for storage. This concentrated composition was diluted with water to a dilution ratio of 4 parts of water:1 part conditioner composition before actual use. This diluted solution was then spread over the cured surface at the rate of 1 gallon (3.785 liters) per 1,000 square feet (92.9 square meters). This solution was found to reduce the coefficient of friction on the cured surface by about 40 to 50% thus making it ideal for ice skating.

To remove the above described solution from the cured surface, a special cleanser composition was formulated and used. The formulation percentages given below were by weight. 53.5% water was placed in a mixing tank with the mixer operating at low speed. The following chemicals were added and blended to yield the final cleanser composition.

10% sodium xylene sulfonate (40% active solution)
    2% monoethanolamine (MEA)
    3.5% free acid of complex organic phosphate ester (wetting Agent)
    3% ethylenediaminetetraceticacid tetra sodium salt (38% active solution)
    5% tetrapotassiumpyrophosphate (60% active solution)
    3% mono-ionic surfactant
    trace Acid Blue No. 1 (dye)

This solution was blended in the blending mixer for a minimum of 30 minutes to ensure uniformly homogeneous mixture. The cleanser was then packaged into metal or plastic drum containers for storage or for use. This concentrated cleanser solution was diluted with water at a dilution ratio of 20 parts water:1 part cleanser or as required for the specific cleansing required.

While the subject invention has been described in some detail, it will be obvious to those skilled in the art that other variations and modifications, within the scope of the specification and the appended claims, may be practiced.

What is claimed is:

1. A curable resin surface coating composition comprising:
   (a) about 50-90% by weight of a resin selected from the group consisting of curable unsaturated polyester resins in styrene solution and epoxy-type resins;
   (b) about 10-60% by weight of a filler paste mixture consisting of dimethyl silicone, polytetrafluoroethylene, polyethylene and ouricury wax; and
   (c) about 2 to 6% by weight of a color pigment.

2. A composition according to claim 1 comprising about 70-85% by weight of a polyester resin in styrene solution; about 10-25% by weight of said filler paste, and about 3-5% by weight of said colored pigment.

3. The composition according to claim 2 wherein said color pigment is titanium dioxide.

4. The composition according to claim 1 further comprising 1-5% by weight of ultraviolet light stabilizers.

5. The composition according to claim 4 wherein said ultraviolet light stabilizers are selected from a group consisting of hydroxylated benzophenones, hydroxylated benzotriazoles, salicylates and acrylonitriles.

6. A composition according to clam 5 wherein said ultraviolet light stabilizers are selected from a group consisting of 2,4-dihydroxy-benzophenone, 2-hydroxy-4-methoxy-benzophenone, 4-dodecyloxy-2-hydroxy-benzophenone, 2-(2'-hydroxy-5'-methyl phenyl) benzotriazole, 2-(3',5'-di-tert-butyl-2'-hydroxy phenyl)-5-chlorobenzotriazole, 2-(3'-tert-butyl-2'-hydroxy-5'-methyl phenyl)-5-chlorobenzotriazole, phenyl salicylate, 2-octyl-2-cyano-3,3-diphenyl acrylate and ethyl-2-cyano-3,3-diphenyl acrylate.

7. A composition according to claim 6 wherein said ultraviolet light stabilizers are present at a concentration of about 1-3% by weight.

8. A composition according to claim 1 wherein said resin is an epoxy type resin comprising a reaction product of epichlorohydrin and bisphenol A, and an amine cross-linking agent.

9. A composition according to claim 1 wherein said resin is a polyester resin and said styrene is present in an amount such that said curable composition when cured has a surface hardness of from Shore D 70 to Shore D 90.

10. The composition according to claim 2 wherein said polyester resin is prepared from alkylene glycol and a dicarboxy compound selected from the group consisting of unsaturated aliphatic dicarboxylic acids, unsaturated aromatic dicarboxylic acids, and anhydrides thereof.

11. The composition according to claim 3 wherein said dicarboxy compound is selected from the group consisting of maleic acid, fumaric acid, adipic acid, phthalic acid, isophthalic acid, succinic acid and anhydrides thereof, and said alkylene glycol is selected from the group consisting of propylene glycol and diethylene glycol.

* * * * *